United States Patent
Kita et al.

(10) Patent No.: US 10,841,702 B2
(45) Date of Patent: Nov. 17, 2020

(54) COMPUTER-READABLE NON-TRANSITORY STORAGE MEDIUM HAVING SOUND PROCESSING PROGRAM STORED THEREIN, SOUND PROCESSING SYSTEM, SOUND PROCESSING APPARATUS, AND SOUND PROCESSING METHOD

(71) Applicant: NINTENDO CO., LTD., Kyoto (JP)

(72) Inventors: Kaoru Kita, Kyoto (JP); Yoshito Sekigawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/778,228

(22) Filed: Jan. 31, 2020

(65) Prior Publication Data

US 2020/0336832 A1    Oct. 22, 2020

(30) Foreign Application Priority Data

Apr. 22, 2019  (JP) ................................ 2019-081014

(51) Int. Cl.
H04R 5/04 (2006.01)
H04R 3/12 (2006.01)
A63F 13/54 (2014.01)

(52) U.S. Cl.
CPC .............. *H04R 5/04* (2013.01); *A63F 13/54* (2014.09); *H04R 3/12* (2013.01); *H04R 2420/01* (2013.01); *H04R 2420/05* (2013.01); *H04R 2499/15* (2013.01)

(58) Field of Classification Search
CPC ........ H04R 5/04; H04R 3/12; H04R 2420/01; H04R 2420/05; H04R 2499/15; A63F 13/54; G06F 3/165; G06F 3/16
See application file for complete search history.

(56) References Cited

U.S. PATENT DOCUMENTS

| | | | |
|---|---|---|---|
| 2008/0162139 A1* | 7/2008 | Yoo .......................... | G10L 13/00 704/260 |
| 2013/0194082 A1* | 8/2013 | Polyakov ................ | G06F 3/016 340/384.5 |
| 2014/0079230 A1 | 3/2014 | Mizuta | |
| 2014/0128160 A1* | 5/2014 | Gillet ..................... | G10H 1/383 463/35 |
| 2014/0292501 A1* | 10/2014 | Lim ......................... | G08B 6/00 340/407.2 |

FOREIGN PATENT DOCUMENTS

JP    2014-60690    4/2014

* cited by examiner

*Primary Examiner* — Fan S Tsang
*Assistant Examiner* — David Siegel
(74) *Attorney, Agent, or Firm* — Nixon & Vanderhye PC (57) ABSTRACT

A BGM signal of sound of BGM is outputted over time, and a sound effect signal of sound of a sound effect is outputted at a timing determined based on information processing. If it is determined that a sound intensity at a predetermined frequency component of the sound effect to be outputted is low or a sound intensity at the predetermined frequency component of the BGM is high, adjustment is performed such that the sound intensity at the predetermined frequency component of the BGM to be outputted at the same timing as the sound effect is decreased. Then, a final sound signal including the sound of the sound effect and the sound of the BGM on which the adjustment has been performed, is synthesized and outputted.

22 Claims, 9 Drawing Sheets

VIRTUAL SPACE
COORDINATE SYSTEM

COMPUTER-READABLE NON-TRANSITORY STORAGE MEDIUM HAVING SOUND PROCESSING PROGRAM STORED THEREIN, SOUND PROCESSING SYSTEM, SOUND PROCESSING APPARATUS, AND SOUND PROCESSING METHOD

CROSS REFERENCE TO RELATED APPLICATION

The disclosure of Japanese Patent Application No. 2019-081014, filed on Apr. 22, 2019, is incorporated herein by reference.

FIELD

The exemplary embodiments relate to sound control processing for controlling output of BGM and a sound effect.

BACKGROUND AND SUMMARY

Hitherto, sound control processing for outputting BGM and a sound effect has been known. In game processing or the like, various sound effects are outputted while playing BGM, thereby allowing the entertainment characteristics of the game to be enhanced.

However, in the conventional technology, when BGM and a sound effect are outputted simultaneously, the sound effect may be drowned out by the BGM, and it may be difficult to hear the sound effect. In this regard, there is room for improvement to make it easier to hear a sound effect.

Therefore, it is an object of the exemplary embodiments to provide a computer-readable non-transitory storage medium having a sound processing program stored therein, a sound processing system, a sound processing apparatus, and a sound processing method that are capable of sound control that makes it easier to hear a sound effect even when BGM and the sound effect are outputted simultaneously.

In order to attain the object described above, for example, the following configuration examples are exemplified.

A configuration example is directed to a computer-readable non-transitory storage medium having a sound processing program stored therein, the sound processing program causing a computer of an information processing apparatus to: output a BGM signal of sound of BGM, over time; output a sound effect signal of sound of a sound effect, at a timing determined based on information processing; if it is determined that a sound intensity at a predetermined frequency component of the sound effect to be outputted is low or a sound intensity at the predetermined frequency component of the BGM is high, perform adjustment such that the sound intensity at the predetermined frequency component of the BGM to be outputted at the same timing as the sound effect is decreased; and generate a final sound signal including the sound of the sound effect and the sound of the BGM on which the adjustment has been performed, by synthesis, and output the final sound signal to the outside.

According to the above configuration example, when the sound intensity at the predetermined frequency component of the sound effect to be outputted is low, the sound intensity at the same predetermined frequency component of the BGM to be outputted at the same timing as the sound effect is decreased, and the sound effect and the BGM are outputted. Accordingly, the volume balance between the sound effect and the BGM can be adjusted, and the sound effect can be heard more reliably.

In another configuration example, the sound processing program may further cause the computer to: calculate a sound intensity at each of a plurality of predetermined frequency components for each of the sound effect signal and the BGM signal; and, for a frequency component for which it is determined that the sound intensity of the sound effect is low among the plurality of predetermined frequency components, perform adjustment such that the sound intensity at said frequency component of the BGM to be outputted at the same timing as the sound effect is decreased.

According to the above configuration example, determination and adjustment of the sound intensities at the plurality of frequency components are performed. Accordingly, finer and more appropriate adjustment is enabled.

In another configuration example, the sound processing program may cause the computer to calculate the sound intensity at each of the plurality of predetermined frequency components on the basis of discrete Fourier transform.

In another configuration example, when the sound intensity at the predetermined frequency component of the sound effect is lower than the sound intensity at the predetermined frequency component of the BGM by a predetermined amount or greater, it may be determined that the sound intensity at the predetermined frequency component of the sound effect is low or the sound intensity at the predetermined frequency component of the BGM is high.

According to the above configuration example, determination based on the relative relationship between the sound effect and the BGM to be outputted at the same time as the sound effect is performed. Thus, more flexible and appropriate adjustment corresponding to the contents of the BGM and the sound effect is enabled.

In another configuration example, when the sound intensity at the predetermined frequency component of the sound effect is lower than a predetermined threshold, it may be determined that the sound intensity at the predetermined frequency component of the sound effect is low.

According to the above configuration example, the determination process can be simplified, and also the volume balance between the sound effect and the BGM can be adjusted.

In another configuration example, when the sound intensity at the predetermined frequency component of the BGM is higher than a predetermined threshold, it may be determined that the sound intensity at the predetermined frequency component of the BGM is high.

In still another configuration example, the sound intensity of the BGM may be set on the basis of the intensity of the sound effect, and, when the sound intensity at the predetermined frequency component of the sound effect is higher than a predetermined threshold, it may be determined that the sound intensity at the predetermined frequency component of the BGM is high.

In another configuration example, the sound effect signal and the BGM signal may be stereo signals. A monophonic component obtained as a sum signal of a right channel signal and a left channel signal of the sound effect signal may be calculated, and, when a sound intensity at the predetermined frequency component of the monophonic component is low, adjustment may be performed such that a sound intensity at the predetermined frequency component of a monophonic component of the BGM is decreased.

According to the above configuration example, adjustment is further performed for the monophonic component that is a sound around the center. Accordingly, the sound effect of the monophonic component that tends to be drowned out by the BGM can be heard more reliably.

In another configuration example, the sound processing program may further cause the computer to perform game processing on the basis of an operation input to an operation device. Furthermore, the sound effect signal may be a sound effect that is outputted when a predetermined event occurs in a virtual game space while the game processing is performed.

According to the above configuration example, in the game processing, for each of various sound effects, the occurrence timing of each of which is not known, that is, is random, the balance in sound intensity between the sound effect and BGM to be outputted at the same time as the sound effect can be adjusted regardless of the occurrence timing. Accordingly, the sound effect can be more clearly heard by the user, so that the user is allowed to pay attention to a predetermined event within a game or to enjoy more realistic sound effects.

According to the exemplary embodiments, for BGM and a sound effect to be outputted at the same time, the balance in sound intensity between the sound effect and the BGM is adjusted, and the sound effect and the BGM are outputted, whereby the sound effect that tends to be drowned by the BGM can be heard more reliably.

DETAILED DESCRIPTION OF NON-LIMITING EXAMPLE EMBODIMENTS

Hereinafter, an exemplary embodiment will be described.

Figure 1:
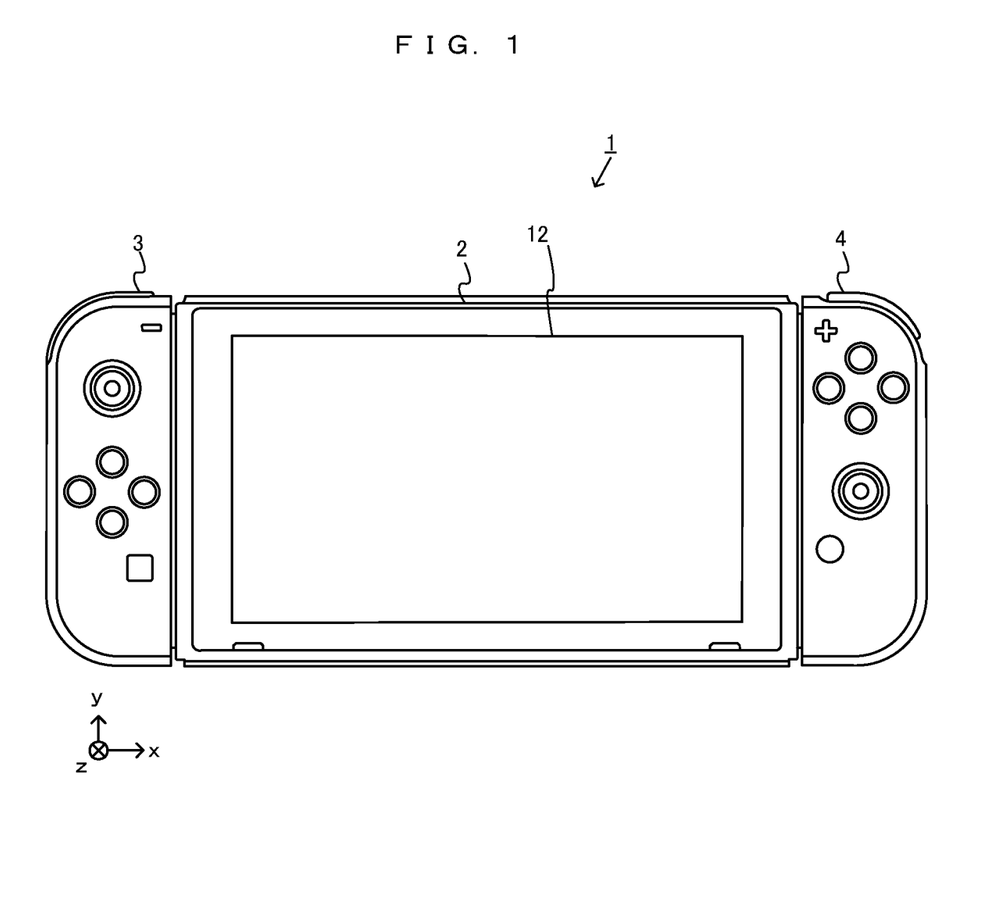
FIG. 1 is a diagram showing a non-limiting example of a state where a left controller 3 and a right controller 4 are attached to a main body apparatus 2.

First, an information processing system for performing information processing according to the exemplary embodiment will be described. In the exemplary embodiment, a game system will be described as an example of the information processing system. This game system may be any system. As an example, FIG. 1 shows the external view of a game system used in this example. The game system 1 shown in FIG. 1 includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Furthermore, in the game system 1, the main body apparatus 2, the left controller 3, and the right controller 4 can also be used as separate bodies. FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various types of processing (e.g., game processing) in the game system 1. The main body apparatus 2 includes a display 12. Each of the left controller 3 and the right controller 4 is an apparatus including operation sections with which a player provides inputs.

Figure 2:
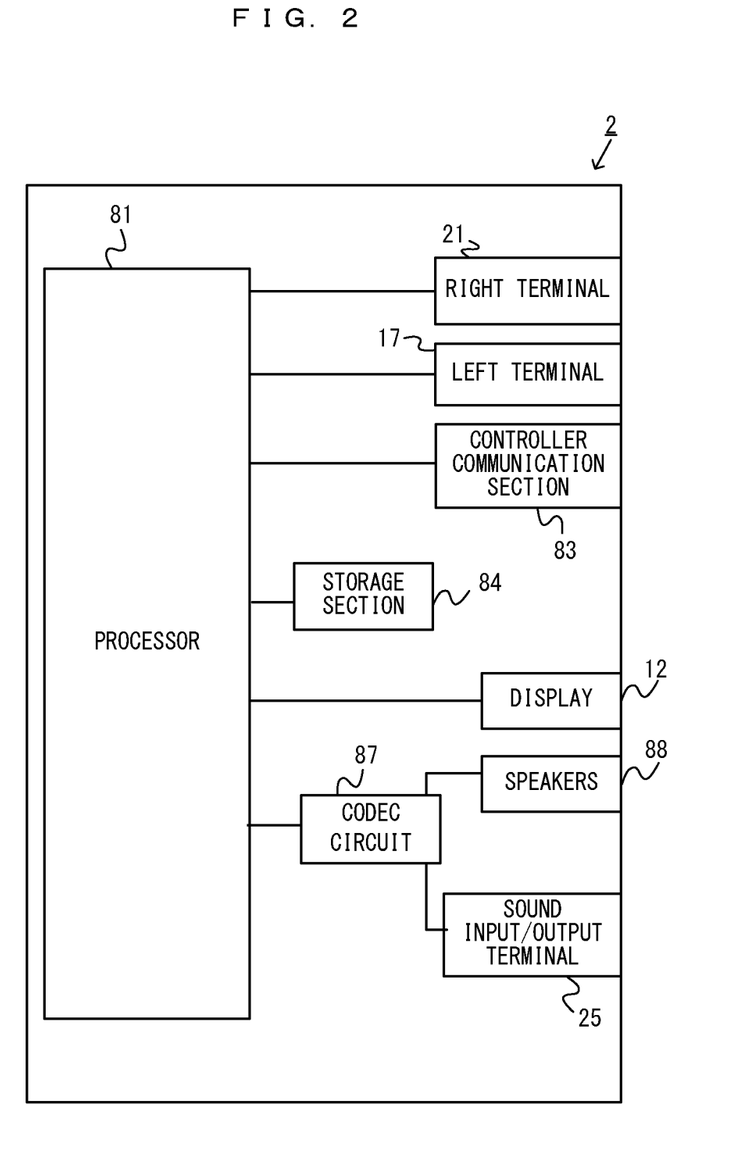
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The main body apparatus 2 includes a controller communication section 83. The controller communication section 83 is connected to the processor 81. In the case of using the main body apparatus 2 and the left controller 3 and the right controller 4 as separate bodies, the controller communication section 83 wirelessly communicates with the left controller 3 and/or the right controller 4. The method for communication between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Furthermore, the main body apparatus 2 includes: a left terminal 17 that is a terminal for the main body apparatus 2 to perform wired communication with the left controller 3; and a right terminal 21 that is a terminal for the main body apparatus 2 to perform wired communication with the right controller 4.

Furthermore, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Although not shown, it is also possible to output an image and sound generated by the main body apparatus 2, to an external monitor/external speaker via a predetermined output terminal.

[Controllers]

Although not shown, the left controller 3 and the right controller 4 each include a communication control section that communicates with the main body apparatus 2. In a state where the left controller 3 and the right controller 4 are attached to the main body apparatus 2, wired communication can be performed via the left terminal 17 and the right terminal 21. Moreover, in the case of using the main body apparatus 2 and the left controller 3 and the right controller 4 as separate bodies, communication with the main body apparatus 2 can be performed through wireless communication without being performed via the terminals. The communication control section acquires information regarding an input (specifically, information regarding an operation) from each input section of the controller. Then, the communication control section transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

[Outline of Sound Control Processing in Exemplary Embodiment]

Next, an outline of operation of processing performed by the game system according to the exemplary embodiment will be described. The processing assumed in the exemplary embodiment is processing regarding sound control. Specifically, when outputting a predetermined sound effect, a process of adjusting the balance of sound intensity (volume) with BGM (background music) that is to be outputted at the same time as the sound effect is performed. Accordingly, drowning out the sound effect by the BGM, resulting in making it difficult to hear the sound effect, can be reduced, thereby allowing the user to more clearly hear the sound effect.

Figure 3:
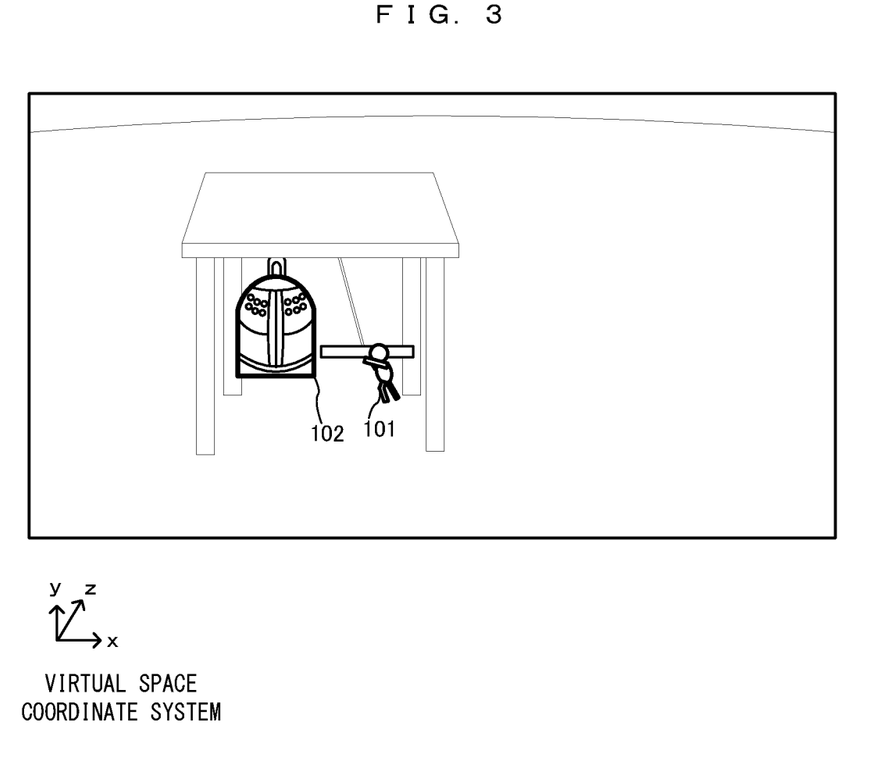
FIG. 3 shows a non-limiting example of a game screen according to an exemplary embodiment.

In the following description, the following situation is assumed. A game according to the exemplary embodiment is a game in which a player object is operated within a virtual three-dimensional game space (hereinafter, simply referred to as a virtual space). FIG. 3 shows an example of a game screen in the exemplary embodiment. In addition, during gameplay, BGM based on predetermined BGM data is outputted in a streaming manner. That is, a BGM signal is outputted over time. A sound signal of the BGM is a stereo signal. Furthermore, as shown in FIG. 3, a bell object 102 is disposed within the virtual space. When the player operates the controllers to cause a player object 101 to make a motion of hitting the bell object 102, a "bell sound" is outputted as a sound effect from the bell object 102 at the timing when the motion is made. A sound signal of the sound effect is also a stereo signal. In the exemplary embodiment, a situation in which the player object 101 is operated and a "bell sound" is outputted at any timing while predetermined BGM is outputted as described above, will be described as an example.

First, the principle and outline of sound control processing according to the exemplary embodiment will be described. In a situation in which BGM is outputted as described above, if a sound effect is further outputted, the sound effect may tend to be drowned out by the BGM depending on the relationship between the volume of the BGM and the volume of the sound effect, and it may be difficult for the player to hear the sound effect. In this case, for example, making it easier to hear the sound effect by reducing the volume of the entire BGM is conceivable. However, by doing so, it may be conversely made difficult to hear the BGM. Moreover, imbalance in volume between the sound effect and the BGM may occur, giving an uncomfortable feeling to the player. Therefore, in the processing according to the exemplary embodiment, the sound intensity of the sound effect is detected for each of a plurality of predefined frequency bands, and control, in which the frequency characteristics of the BGM in the frequency bands corresponding to these predefined frequency bands are changed (more specifically, are adjusted such that gain is decreased), is performed. That is, by decreasing a frequency characteristic in only a part of the entire frequency band of the BGM, it is made easier to hear a sound effect outputted at the same time as the BGM, while the volume (ease of hearing) of the entire BGM is substantially maintained.

Figure 4:
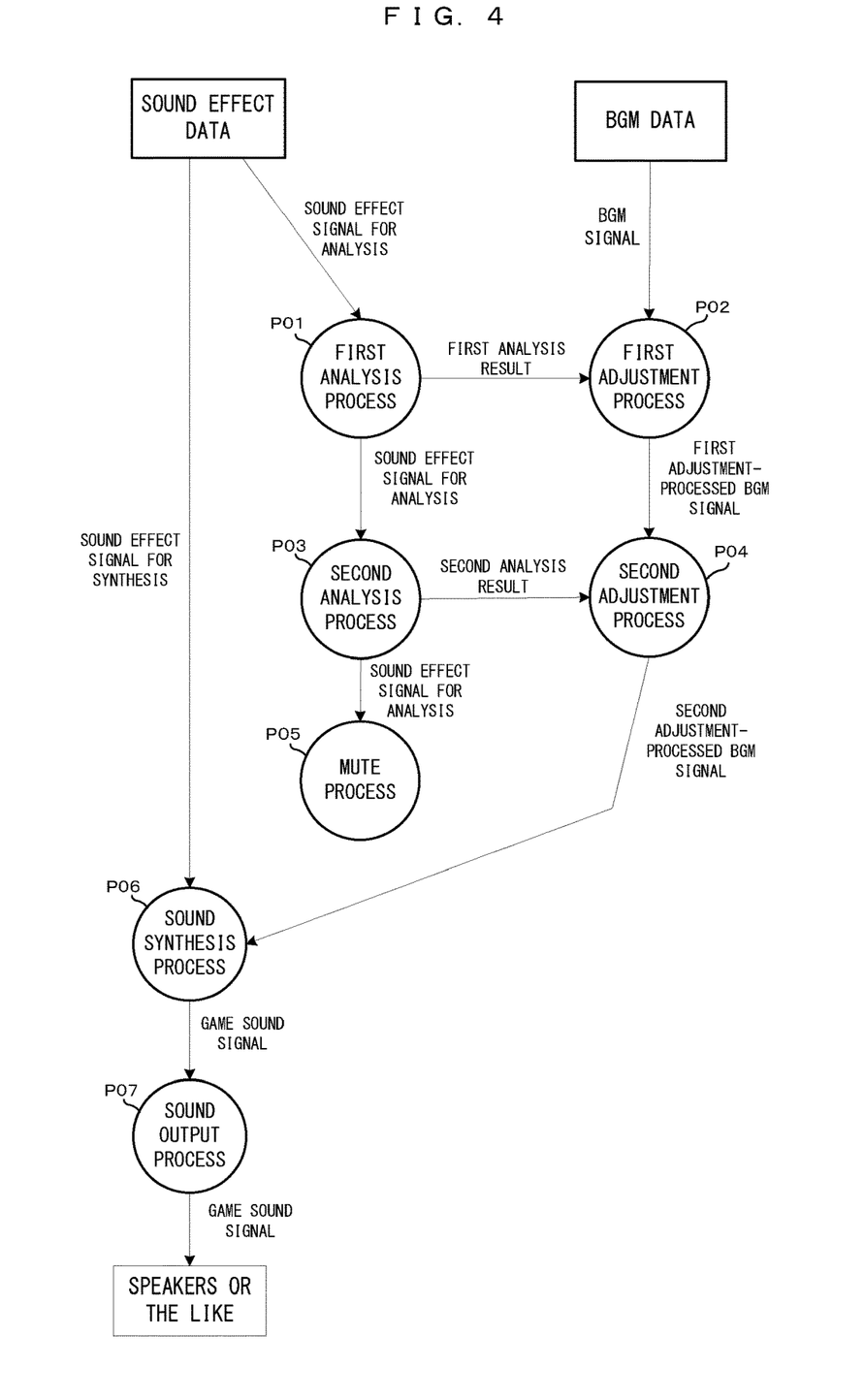
FIG. 4 is a diagram showing an outline of sound control processing of the exemplary embodiment.

FIG. 4 shows the outline of the sound control processing according to the exemplary embodiment. In FIG. 4, as an input source, sound effect data and BGM data are shown. In addition, processing related to a sound effect and processing related to BGM are performed in parallel while being linked to each other. First, a rough flow of the processing for the sound effect will be described. In the exemplary embodiment, a sound effect signal based on the sound effect data is generated and outputted to a first analysis process P01. In addition, simultaneously with this, the sound effect signal is also outputted to a later-described sound synthesis process P06. That is, the sound effect signal is outputted to two paths. Hereinafter, the sound effect signal related to the former is referred to as a "sound effect signal for analysis", and the sound effect signal related to the latter is referred to as a "sound effect signal for synthesis".

In the first analysis process P01, a later-described analysis process is performed, and information indicating the result of the analysis process is outputted as a first analysis result to a first adjustment process P02. In a second analysis process P03, a later-described analysis process is performed, and information indicating the result of the analysis process is outputted as a second analysis result to a second adjustment process P04. A process of muting the sound is performed through a mute process P05 on the sound effect signal for analysis on which the second analysis process P03 has been ended. As a result, the sound effect signal for analysis is not outputted.

Next, a rough flow of the processing related to the BGM will be described. First, a BGM signal based on the BGM data is generated and outputted to the first adjustment process P02. In addition, as described above, the first analysis result is also inputted to the first adjustment process P02. In the first adjustment process P02, a process of changing a frequency characteristic as described later is performed on the BGM signal on the basis of the first analysis result. Then, a BGM signal resulting from the execution of this process is outputted as a "first adjustment-processed BGM signal" to the second adjustment process P04.

In the second adjustment process P04, as described above, the second analysis result is also inputted. Then, in the second adjustment process P04, a process of further changing a frequency characteristic is performed on the first adjustment-processed BGM signal on the basis of the second analysis result. Then, a BGM signal resulting from the execution of this process is outputted as a "second adjustment-processed BGM signal" to the sound synthesis process P06.

In the sound synthesis process P06, a game sound signal that is a sound signal to be finally outputted is generated by synthesizing the "sound effect signal for synthesis" and the "second adjustment-processed BGM signal", and is outputted to a sound output process P07. In the sound output process P07, the game sound signal is outputted to speakers or the like.

[Outline of First Analysis Process]

Next, an outline of processing in the first analysis process P01 will be described. In the first analysis process P01, the following processing is performed. First, the sound intensity of an inputted sound effect is detected for each frequency band, for example, using fast Fourier transform (FFT) (FFT is a kind of algorithm for causing the processor 81 to perform discrete Fourier transform at high speed). The sound intensity can be represented, for example, in decibels (that is, may be regarded as volume). Next, the frequency band of the sound effect is divided into eight frequency bands, and whether the sound intensity of the sound effect satisfies a condition for requiring adjustment at the BGM side is determined for each of the frequency bands. Here, in the exemplary embodiment, as an example, the frequency band is divided into frequency bands such that eight frequency components of 135 Hz, 240 Hz, 426 Hz, 757 Hz, 1000 Hz, 1346 Hz, 2391 Hz, and 4249 Hz are the center frequencies of the respective frequency bands. In addition, the adjustment at the BGM side is required when the sound effect is drowned out by the BGM and it becomes difficult to hear the sound effect. That is, a situation in which the sound effect is small or the BGM is loud is conceivable as such a situation. As for a method of determination as to a condition for requiring the adjustment at the BGM, the following methods exist. First, in the case where the volume of the sound effect and the volume of the BGM are independent from each other, there is a method of determining whether the sound intensity in the frequency band of the sound effect is lower than a preset threshold. Moreover, it may be determined whether the sound intensity in the frequency band of the BGM is higher than a preset threshold. Another method is a method of determining whether the difference between the sound intensity of the sound effect and the sound intensity of the BGM to be outputted at the same timing as the sound effect exceeds a predetermined threshold. That is, there is also a method of performing determination based on a relative relationship between the sound intensity of the sound effect and the sound intensity of the BGM to be outputted at the same time as the sound effect. Furthermore, the sound intensity of the sound effect and the sound intensity of the BGM may be linked to each other, and, in such a case, there is a method of performing adjustment if the sound intensity of the sound effect or the BGM exceeds a predetermined threshold. This is because, even when differences between the sound intensity of the sound effect and the sound intensity of the BGM are the same, if both sound intensities are high, the sound intensity of the BGM is higher, and thus the sound effect is drowned out and it becomes difficult to hear the sound effect. In the exemplary embodiment, a method based on the difference between the sound intensity of the sound effect and the sound intensity of the BGM is used. Specifically, whether the sound intensity of the sound effect is lower than the sound intensity of the BGM by greater than a threshold is determined for each of the eight frequency bands. That is, it is determined how much the sound intensity of the sound effect is relatively low with respect to the BGM. If the sound intensity of the sound effect is lower than the sound intensity of the BGM by a predetermined amount or greater, it is determined that a later-described adjustment process at the BGM side is required. In addition, if not, it is determined that the adjustment process is not required. Then, information indicating such a determination result is outputted as the first analysis result to the first adjustment process P02. The information has a function as a control signal for processing in the first adjustment process P02.

[Outline of First Adjustment Process]

Figure 5:
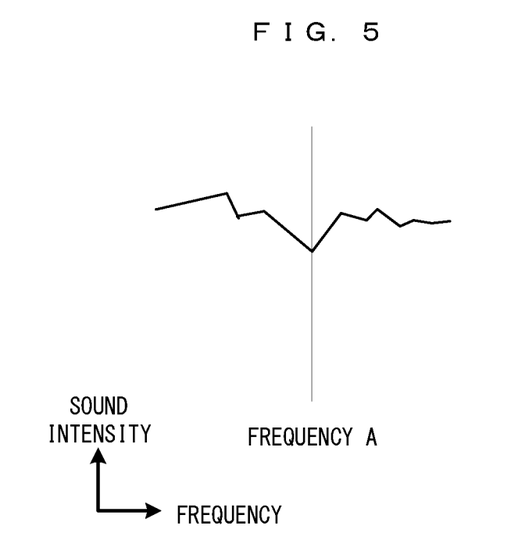
FIG. 5 is a diagram for explaining a non-limiting example of frequency characteristic adjustment.
Figure 6:
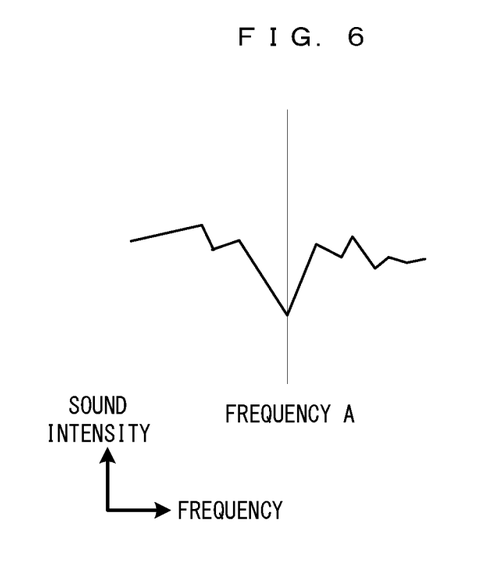
FIG. 6 is a diagram for explaining a non-limiting example of frequency characteristic adjustment.

Next, an outline of processing in the first adjustment process P02 will be described. In this process, a frequency band for which frequency characteristic adjustment is required is determined on the basis of the first analysis result. Then, a process of changing a frequency characteristic in this frequency band is performed. Specifically, an equalizer process called "peaking" is performed. Here, peaking is a process of increasing or decreasing the sound intensity around a selected frequency. In this example, the frequency band is adjusted such that gain is decreased. That is, adjustment is performed such that the sound intensity of the BGM is decreased. FIGS. 5 and 6 show an example of such adjustment. FIG. 5 is a diagram showing a part of the frequency characteristics of the BGM before the adjustment (for example, a portion corresponding to 240 Hz among the eight frequency bands). FIG. 6 is a diagram showing a part of the frequency characteristics of a BGM signal after the adjustment. In each of FIGS. 5 and 6, the vertical axis indicates sound intensity (volume), and the horizontal axis indicates frequency. In this example, as a result of adjustment being performed for a predetermined frequency A in FIG. 5 such that gain is decreased, the frequency characteristics of the BGM are adjusted as shown in FIG. 6. The BGM signal adjusted as described above is outputted as the first adjustment-processed BGM signal to the second adjustment process P04.

[Outline of Second Analysis Process]

Next, an outline of processing in the second analysis process P03 will be described. In this process, first, so-called mid/side processing (MS processing) is performed on the sound effect signal, and the sound effect signal is separated to a monophonic component (hereinafter, referred to as a mono component) and a stereo component (sometimes referred to as a side component). The mono component is also referred to as Mid component, and is a component obtained as a sum signal, which is a right channel signal+a left channel signal, on the basis of a stereo sound signal including signals of two channels for left and right. In addition, the mono component can be considered as a sound at a center localization. Next, the sound intensity of the mono component is detected, and it is determined whether a condition for requiring adjustment of a mono component at the BGM side is satisfied. Here, in the exemplary embodiment, frequency bands respectively having center frequencies that are two frequencies of 510 Hz and 2850 Hz are predefined as frequency bands for the mono component. Therefore, the sound intensity is detected for each of the two frequency bands. Then, if the sound intensity of the mono component at the sound effect side in each of the frequency bands is lower than the sound intensity of the mono component at the BGM side by greater than a threshold, it is determined that adjustment of the mono component at the BGM side is required. Then, information indicating such a determination result is outputted as the second analysis result to the second adjustment process P04. In addition, the sound effect signal for analysis that is used here is outputted to the mute process P05.

[Outline of Second Adjustment Process]

Next, an outline of processing in the second adjustment process P04 will be described. In this process, the above MS processing is performed on the first adjustment-processed BGM signal, and a peaking process that is the same as described above is performed on the mono component of the BGM on the basis of the second analysis result. In this example, the peaking process is further performed for the frequency bands with 510 Hz and 2850 Hz that are defined as the frequency bands for the mono component. Accordingly, the sound effect, around the center, that tends to be drowned by the BGM can be heard more reliably. Then, the BGM signal further adjusted as described above is outputted as the second adjustment-processed BGM signal to the sound synthesis process P06.

As described above, in the exemplary embodiment, the sound intensity of the sound effect and the sound intensity of the BGM are compared with each other in each of the eight frequency bands. Then, if the sound intensity at the sound effect side is lower than the sound intensity at the BGM side by greater than the threshold, adjustment is performed for the frequency component of the BGM in the corresponding frequency band such that gain at the frequency component is decreased. Then, the adjusted BGM and the sound effect (that has not been adjusted) are synthesized and outputted as a game sound. Accordingly, the sound effect that tends to be drowned out by the BGM can be more clearly heard without causing great imbalance in volume between the BGM and the sound effect.

In the exemplary embodiment, if the sound intensity at the sound effect side is lower to some extent than the sound intensity at the BGM side, adjustment is performed such that the sound intensity (in a part of the frequency bands) at the BGM side is decreased. In this regard, an adjustment method of increasing the sound intensity at the sound effect side without changing the sound intensity at the BGM side is also conceivable. However, by doing so, an amount by which the volume of the sound effect is increased is added, so that the sound may become saturated and it may become difficult to hear the sound effect. Therefore, in the exemplary embodiment, an adjustment method of decreasing the sound intensity (in a part of the frequency bands) of the BGM side is used.

[Details of Game Processing of Exemplary Embodiment]

Next, the game processing in the exemplary embodiment will be described in more detail with reference to FIGS. 7 to 10.

[Data to be Used]

Figure 7:
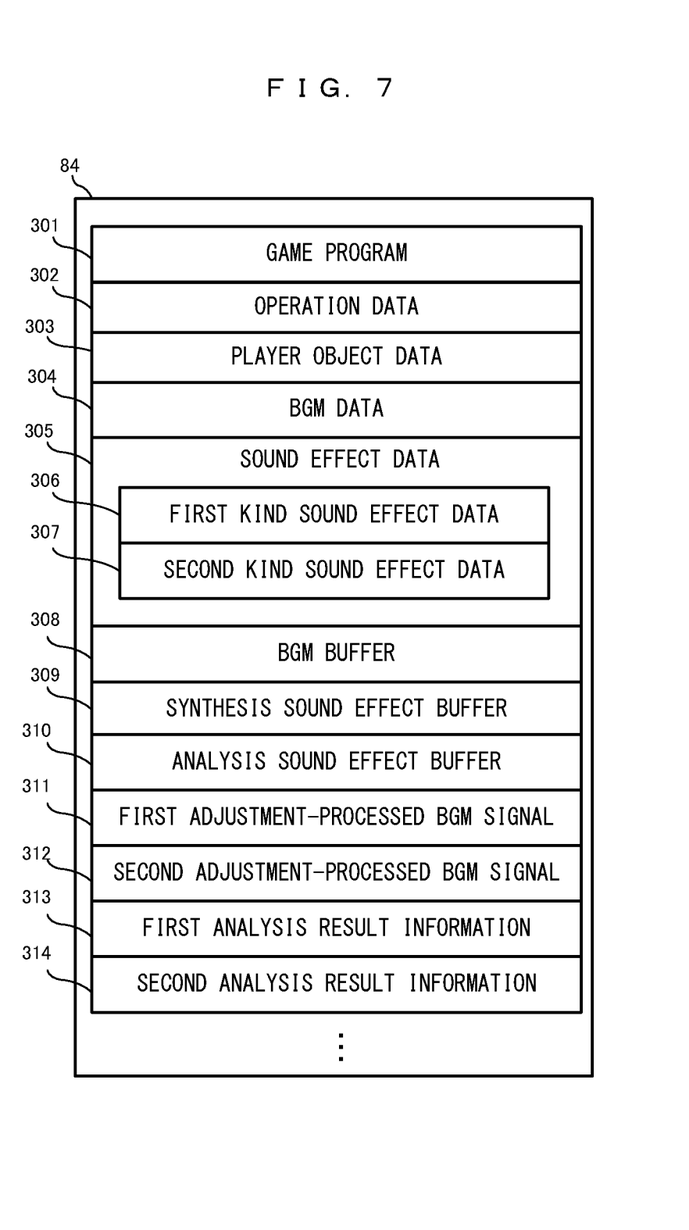
FIG. 7 is a memory map showing a non-limiting example of various kinds of data stored in a storage section 84.

First, various kinds of data to be used in the game processing will be described. FIG. 7 is a memory map showing an example of various kinds of data stored in the storage section 84 of the main body apparatus 2. In the storage section 84 of the main body apparatus 2, a game program 301, operation data 302, player object data 303, BGM data 304, sound effect data 305, a BGM buffer 308, a synthesis sound effect buffer 309, an analysis sound effect buffer 310, a first adjustment-processed BGM signal 311, a second adjustment-processed BGM signal 312, first analysis result information 313, second analysis result information 314, etc., are stored.

The game program 301 is a program for performing the game processing according to the exemplary embodiment.

The operation data 302 is data acquired from the left controller 3 and the right controller 4, and is data indicating the content of an operation by the player. The operation data 302 includes data indicating pressed states of various buttons of each controller, data for indicating the content of an operation on the analog stick, etc.

The player object data 303 is data regarding the player object 101 and includes data indicating the appearance of the player object 101, data indicating the current position of the player object within the virtual space, etc.

The BGM data 304 is sound data of BGM as described above.

The sound effect data 305 is sound data of various sound effects. Here, in the exemplary embodiment, the following two kinds of sound effects are defined. First, a sound effect for which the above-described sound control processing is performed when outputting the sound effect, is defined as a first kind sound effect. In addition, a sound effect for which the above-described sound control processing is not performed when outputting the sound effect, is defined as a second kind sound effect. The first kind sound effect is, for example, a type of sound effect that is outputted when a predetermined event occurs within the game on the basis of an operation by the player. In the above example of a "bell sound", an event in which the "player object 101 rings a bell" occurs when the player object 101 makes a motion of hitting the bell object 102 on the basis of an operation by the player. Then, a sound effect of a "bell sound" is outputted. When outputting the sound effect, the above-described sound control processing is performed, and (a game sound obtained by synthesizing) the "bell sound" and BGM are outputted in a state where the balance between the "bell sound" and the BGM has been adjusted. Meanwhile, the second kind sound effect is, for example, a sound effect having a background role such as a wind sound, or the like. In other words, the first kind sound effect is a type of sound effect that is desired to be clearly heard by the player when outputted, or output of which is desired to be clearly recognized by the player. In addition, the second kind sound effect can be considered as a background sound effect having no such intention, for example, as a sound effect having no intention to make the player to positively recognize that the sound effect is being outputted. The sound effect data 305 includes first kind sound effect data 306 that is sound data for the first kind sound effect, and second kind sound effect data 307 that is sound data for the second kind sound effect. Which sound effect is defined as the first kind sound effect or the second kind sound effect may be set as appropriate by a developer according to the contents of the game processing.

The BGM buffer 308 is for temporarily storing a BGM signal to be outputted. In the exemplary embodiment, BGM is outputted to the speakers or the like in a streaming manner. When outputting the BGM, a BGM signal to be outputted is stored in the BGM buffer 308, and is outputted from the BGM buffer 308 to the speakers or the like. In addition, a BGM signal to be adjusted for balance with a sound effect as described above is also acquired from this BGM buffer.

The synthesis sound effect buffer 309 and the analysis sound effect buffer 310 are areas for temporarily storing a sound effect signal in processing of later-described flowcharts. The synthesis sound effect buffer 309 can be considered to be used for outputting a sound effect signal generated from sound effect data, to the sound synthesis process P06 without processing the sound effect signal. The analysis sound effect buffer 310 has a function of temporarily storing a sound effect signal in order to use the sound effect signal in the processing in the first analysis process P01 and the second analysis process P03.

The first adjustment-processed BGM signal 311 is a BGM signal to be outputted as a processing result of the first adjustment process P02 shown in FIG. 4 described above. In addition, the second adjustment-processed BGM signal 312 is a BGM signal to be outputted as a processing result of the second adjustment process P04. That is, the first adjustment-processed BGM signal 311 and the second adjustment-processed BGM signal 312 are each temporary data used in a series of processes for changing a part of the frequency characteristics of the BGM in accordance with the sound effect to be outputted at the same time as the BGM.

Each of the first analysis result information 313 and the second analysis result information 314 is also temporary data used in the above-described sound control processing. The first analysis result information 313 is information indicating an analysis result in the first analysis process P01. In this example, the first analysis result information 313 is information indicating an analysis result for each of eight frequency bands having median values that are eight frequency components of 135 Hz, 240 Hz, 426 Hz, 757 Hz, 1000 Hz, 1346 Hz, 2391 Hz, and 4249 Hz, that is, information indicating whether a difference exceeds the above threshold is stored therein. The second analysis result information 314 is information indicating an analysis result in the second analysis process P03. In this example, the second analysis result information 314 is information indicating an analysis result for each of two bands with 510 Hz and 2850 Hz (for the mono component), that is, information indicating whether a difference exceeds the above threshold is stored therein.

[Details of Processing Performed by Processor 81]

Figure 8:
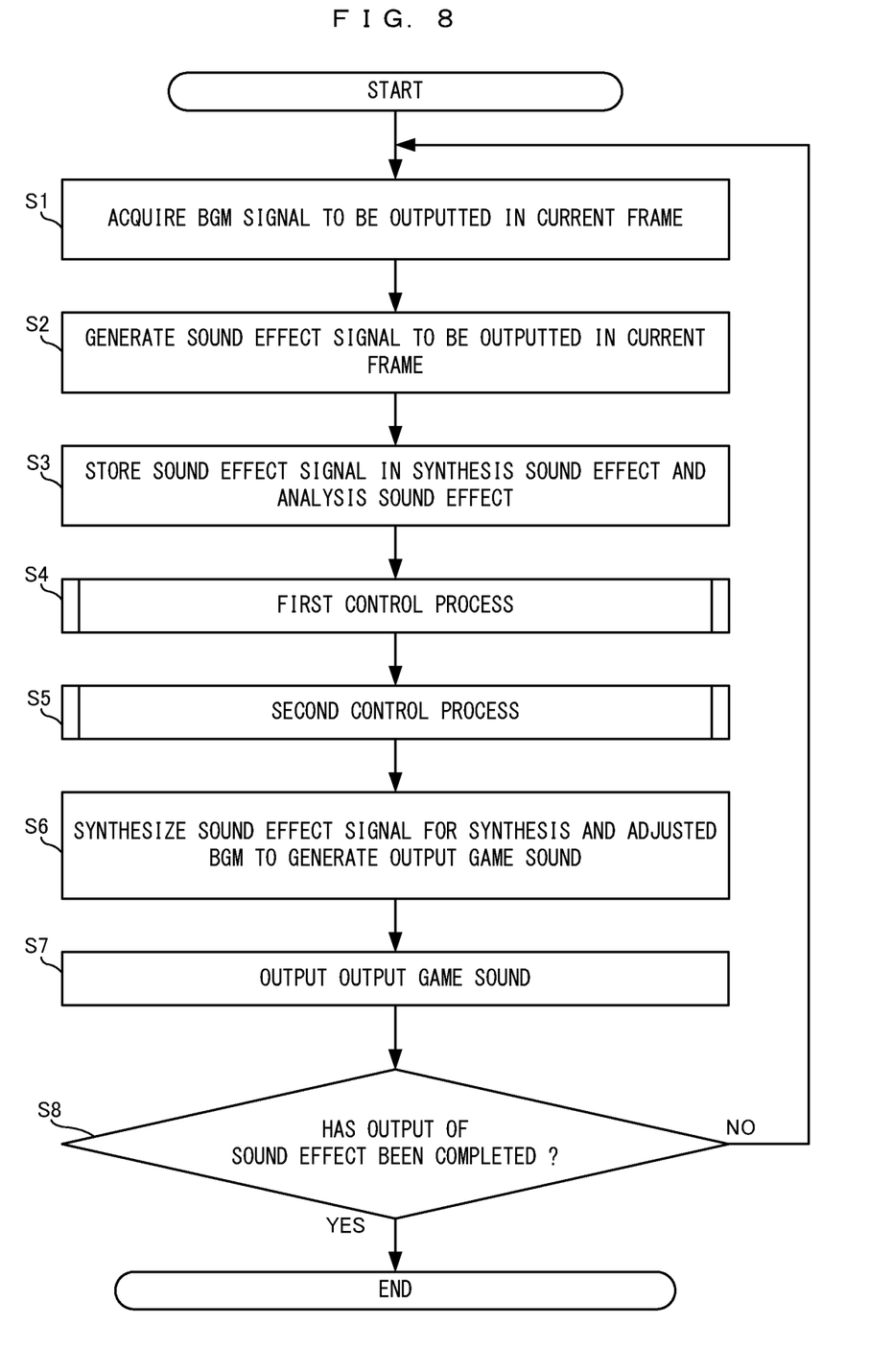
FIG. 8 is a flowchart showing the details of sound output control processing according to the exemplary embodiment.
Figure 9:
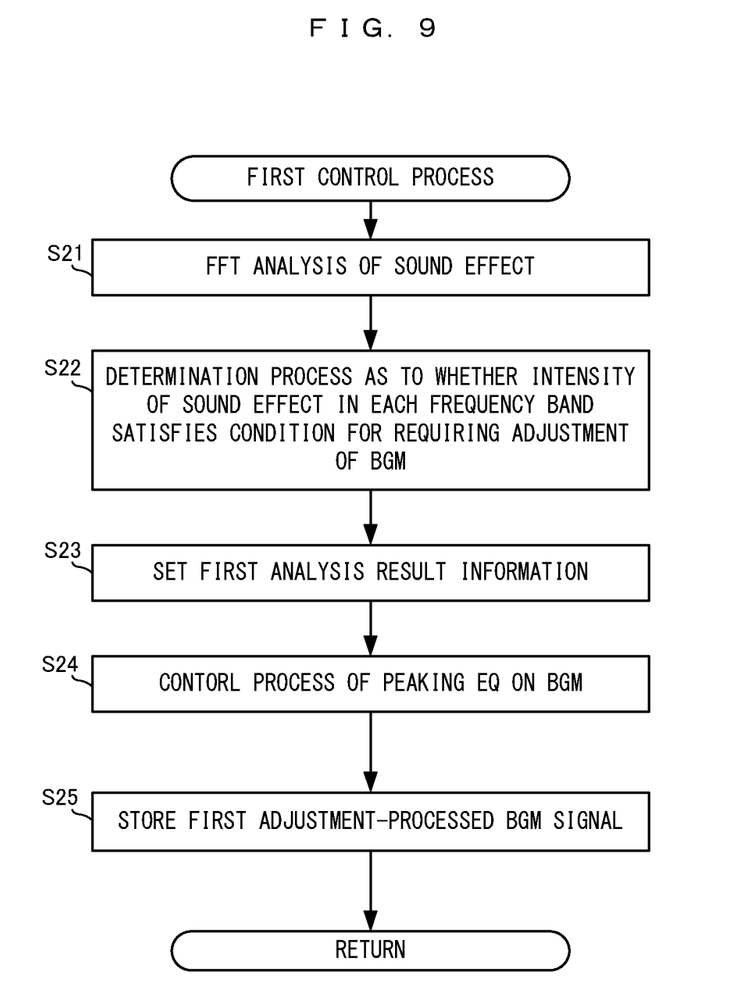
FIG. 9 is a flowchart showing the details of a first control process.

The sound output control processing according to the exemplary embodiment will be described in detail with reference to flowcharts in FIGS. 8 to 10. The flowchart shown in FIG. 8 shows processes performed when outputting the above-described first kind sound effect, in the game processing. In the above example, the processes are processes performed when outputting a "bell sound". Here, processes for adjusting the output balance between the above first kind sound effect and BGM will be mainly described, and the description of other game processing is omitted. In addition, a processing loop of steps S1 to S8 shown in FIG. 8 is repeatedly performed, for example, every frame period.

The flowcharts are merely an example of the processing. Therefore, the order of each process step may be changed as long as the same result is obtained. In addition, the values of variables and thresholds used in determination steps are also merely examples, and other values may be used as necessary.

In FIG. 8, first, in step S1, the processor 81 acquires a BGM signal to be outputted in processing for the current frame, from the BGM buffer 308. In the exemplary embodiment, a BGM signal is generated on the basis of the BGM data 304 in a process different from the flow shown in FIG. 8, and the BGM signal is outputted (buffered) to the BGM buffer 308 (by streaming) over time. Then, the processor 81 acquires a BGM signal to be outputted in the current frame, from the BGM buffer 308.

Next, in step S2, the processor 81 acquires sound data of a sound effect to be outputted in the current frame, on the basis of the first kind sound effect data 306. Furthermore, the processor 81 generates a sound effect signal on the basis of the sound data.

Next, in step S3, the processor 81 stores the generated sound effect signal in the synthesis sound effect buffer 309 and the analysis sound effect buffer 310.

Next, in step S4, the processor 81 performs a first control process. In the first control process, a process corresponding to the first analysis process P01 and the first adjustment process P02 shown in FIG. 4 described above is performed. FIG. 9 is a flowchart showing the details of the first control process. First, in step S21, the processor 81 acquires the sound effect signal from the analysis sound effect buffer 310, performs FFT analysis on the sound effect signal, and detects a sound intensity in each frequency band. Furthermore, the processor 81 divides the detected sound intensity in each frequency band into sound intensities in eight frequency bands having center frequencies that are 135 Hz, 240 Hz, 426 Hz, 757 Hz, 1000 Hz, 1346 Hz, 2391 Hz, and 4249 Hz as described above, and outputs the maximum value of the sound intensity in each of the frequency bands.

Next, in step S22, the processor 81 determines whether the maximum value of sound calculated above satisfies a condition, for each of the eight frequency bands. In the exemplary embodiment, the following determination is performed as an example. Specifically, it is determined whether the maximum value (db value) of the sound effect is lower than the maximum value (db value) of sound in the same frequency band in the BGM signal acquired in step S1 described above, by 46 db or greater. For example, in the case with 135 Hz, the db values at a frequency component of 135 Hz of the sound effect signal for analysis and the BGM signal are compared with each other, and it is determined whether the db value of the sound effect is lower than the db value of the BGM by greater than a threshold. In other words, it is determined whether a difference obtained as "db value of sound effect−db value of BGM" exceeds a threshold. Such determination is performed for each of the eight frequency bands.

Next, in step S23, the processor 81 stores information indicating the analysis result in step S22 described above, that is, information indicating whether the difference in each frequency band exceeds the threshold, as the first analysis result information 313 in the storage section 84.

Next, in step S24, the processor 81 performs a process of adjusting the BGM signal, on the basis of the first analysis result information 313. Specifically, the processor 81 performs a peaking process based on the first analysis result information 313, for each of the eight frequency bands of the BGM signal acquired in step S1 described above. More specifically, for any frequency band for which it is determined that the db value of the sound effect is lower than the db value of the BGM by greater than the threshold among the eight frequency bands, the processor 81 changes the frequency characteristic in this frequency band such that gain is decreased. That is, the processor 81 performs a process of decreasing the sound intensity at the BGM side. For any frequency band for which it is determined that the db value of the sound effect is not lower than the db value of the BGM by greater than the threshold, the processor 81 does not perform such a process of changing the frequency characteristic.

Next, in step S25, the processor 81 stores the BGM signal subjected to the process in step S24 described above, as the first adjustment-processed BGM signal 311 in the storage section 84. When the above frequency characteristic change has not been performed for all the eight frequency bands, consequently, a signal that is the same as the BGM signal acquired in step S1 described above is stored as the first adjustment-processed BGM signal 311 in the storage section 84. This is the end of the first control process.

Referring back to FIG. 8, next, in step S5, the processor 81 performs a second control process. In this process, a process corresponding to the second analysis process P03 and the second adjustment process P04 shown in FIG. 4 described above is performed. That is, a process for further adjusting a mono component as described above is performed.

Figure 10:
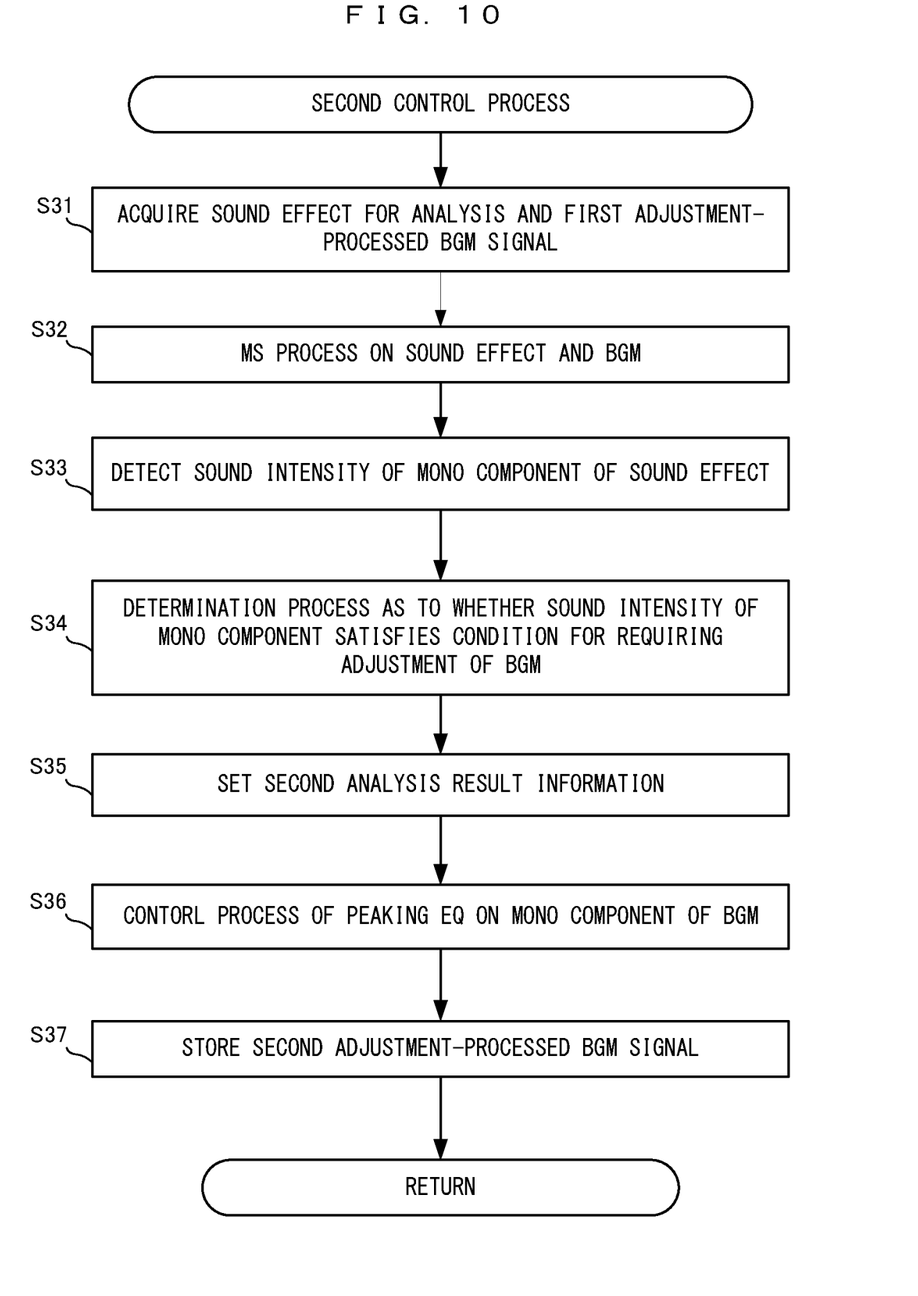
FIG. 10 is a flowchart showing the details of a second control process.

FIG. 10 is a flowchart showing the details of the second control process. In FIG. 10, first, in step S31, the processor 81 acquires the sound effect signal from the analysis sound effect buffer 310. Furthermore, the processor 81 acquires the BGM signal on which the first control process has been performed, from the first adjustment-processed BGM signal 311.

Next, in step S32, the processor 81 performs the above-described MS processing on each of the sound effect signal and the BGM signal acquired in step S31 described above, to separate each signal to a mono component and a stereo component.

Next, in step S33, the processor 81 detects the sound intensity of the mono component of the sound effect. In the exemplary embodiment, two frequency bands with 510 Hz and 2850 Hz are defined as frequency bands corresponding to the mono component. Therefore, the processor 81 detects the sound intensity in each of the two frequency bands.

Next, in step S34, the processor 81 determines whether the sound intensity of the mono component of the sound effect exceeds a predetermined threshold. In the exemplary embodiment, the processor 81 determines whether the respective maximum values (db values) at frequency components of 510 Hz and 2850 Hz of the sound effect are lower than the respective maximum values (db values) at the same frequency components (the same mono components) in the first adjustment-processed BGM signal 311 by a threshold or greater.

Next, in step S35, the processor 81 stores the determination result in step S34 described above, that is, information whether the maximum value in each of the frequency bands exceeds the threshold, as the second analysis result information 314 in the storage section 84.

Next, in step S36, the processor 81 performs a process of adjusting the first adjustment-processed BGM signal 311, on the basis of the second analysis result information 314. Specifically, the processor 81 performs a peaking process based on the second analysis result information 314 for the two frequency bands of the mono component. More specifically, for any frequency band for which it is determined that the db value of the sound effect is lower than the db value of the BGM by greater than the threshold among the two frequency bands of the mono component, the processor 81 changes the frequency characteristic in this frequency band such that gain is decreased. For any frequency band for which it is determined that the db value of the sound effect is not lower than the db value of the BGM by greater than the threshold, similar to the case of the first control process, the processor 81 does not perform such a process of changing the frequency characteristic.

Next, in step S37, the processor 81 synthesizes the BGM signal of the mono component subjected to the process in step S36 described above and the BGM signal of the stereo component resulting from the separation, and stores the resultant signal as the second adjustment-processed BGM signal 312 in the storage section 84. When the frequency characteristic change has not been performed for all the two frequency bands, consequently, a signal that is the same as the first adjustment-processed BGM signal 311 acquired in step 31 described above is stored as the second adjustment-processed BGM signal 312 in the storage section 84. This is the end of the second control process.

Referring back to FIG. 8, next, in step S6, the processor 81 performs a process of outputting an output game sound in which the processing results of the first control process and the second control process are reflected. Specifically, the processor 81 acquires the sound effect signal from the synthesis sound effect buffer 309. Furthermore, the processor 81 acquires the BGM signal from the second adjustment-processed BGM signal 312. Then, the processor 81 generates an output game sound by synthesizing the acquired sound effect signal and BGM signal. That is, an output game sound obtained by synthesizing the first kind sound effect not subjected to processing and the BGM subjected to the above adjustment is generated.

Next, in step S7, the processor 81 performs a process of outputting the output game sound to the speakers or the like.

Next, in step S8, the processor 81 determines whether output of the first kind sound effect to be outputted this time has been completed. For example, if the reproduction time for the sound effect is three seconds, the processor 81 determines whether the above-described control processes have been performed on the sound effect for three seconds and the BGM to be outputted at the same time as the sound effect. As a result of the determination, if any unprocessed portion remains (NO in step S8), the processor 81 returns to step S1 described above and repeats the processing. If no unprocessed portion remains (YES in step S8), the sound output control processing ends.

In another embodiment, the output game sound in step S7 described above may be stored in a predetermined output buffer, and may be outputted via this buffer to the speakers or the like.

As described above, in the exemplary embodiment, on the basis of the sound intensity in the predetermined frequency band of the sound effect, the frequency characteristic in the corresponding frequency band of the BGM is adjusted such that gain is decreased, and the sound effect and the BGM are outputted. Accordingly, drowning out the sound effect by the BGM, resulting in making it difficult to hear the sound effect, can be prevented without greatly changing the entire volume balance between the sound effect and the BGM. As a result, sound saturation can be alleviated, and the predetermined sound effect (the first kind sound effect in this example) can be clearly heard by the user.

[Modifications]

In the above embodiment, the example in which the frequency band is divided into eight frequency bands (two frequency bands for a mono component) and the processing is performed, has been described. However, in another embodiment, the frequency band may be divided into more frequency bands, and the above processing may be performed. By dividing the frequency band more finely, the above adjustment at the BGM side can be performed with higher accuracy.

In the above embodiment, the case of outputting a bell sound when the player object 101 hits the bell object 102 has been taken as an example of the first kind sound effect. Other than the case of outputting a sound that occurs due to a motion of the player object 101 as described above, for example, a sound effect that can occur even when the player object 101 has not made a specific motion for causing a sound, such as an explosion sound of a bomb that explodes when the player object 101 merely comes close to the bomb, may be defined as the first kind sound effect.

In the above embodiment, the case of applying the above control processing to the game processing in the game system has been described as an example. However, application of the above control processing is not limited to application to the game processing, and, for example, the above control processing is applicable to VR content having no game elements, or the like.

In the above embodiment, the case where the series of processes according to the game processing are performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having a sound processing program stored therein, the sound processing program, when executed, causing a computer of an information processing apparatus to:
   output a background music (BGM) signal of sound of BGM, over time;
   output a sound effect signal of sound of a sound effect, at a timing determined based on information processing;
   if it is determined that a sound intensity at a predetermined frequency component of the sound effect to be outputted is low or a sound intensity at the predetermined frequency component of the BGM is high, perform adjustment such that the sound intensity at the predetermined frequency component of the BGM to be outputted, at the same timing as the sound effect, is decreased; and
   generate a final sound signal including the sound of the sound effect and the sound of the BGM on which the adjustment has been performed, by synthesis, and output the final sound signal to the outside.

2. The storage medium according to claim 1, wherein the sound processing program, when executed, further causes the computer to:
   calculate a sound intensity at each of a plurality of predetermined frequency components for each of the sound effect signal and the BGM signal; and
   for a frequency component for which it is determined that the sound intensity of the sound effect is low among the plurality of predetermined frequency components, perform adjustment such that the sound intensity at said frequency component of the BGM to be outputted, at the same timing as the sound effect, is decreased.

3. The storage medium according to claim 2, wherein the sound processing program, when executed, causes the computer to calculate the sound intensity at each of the plurality of predetermined frequency components based on a discrete Fourier transform.

4. The storage medium according to claim 1, wherein, when the sound intensity at the predetermined frequency component of the sound effect is lower than the sound intensity at the predetermined frequency component of the BGM by a predetermined amount or greater, it is determined that the sound intensity at the predetermined frequency component of the sound effect is low or the sound intensity at the predetermined frequency component of the BGM is high.

5. The storage medium according to claim 1, wherein, when the sound intensity at the predetermined frequency component of the sound effect is lower than a predetermined threshold, it is determined that the sound intensity at the predetermined frequency component of the sound effect is low.

6. The storage medium according to claim 1, wherein, when the sound intensity at the predetermined frequency component of the BGM is higher than a predetermined threshold, it is determined that the sound intensity at the predetermined frequency component of the BGM is high.

7. The storage medium according to claim 1, wherein
   the sound intensity of the BGM is set based on an intensity of the sound effect, and
   when the sound intensity at the predetermined frequency component of the sound effect is higher than a predetermined threshold, it is determined that the sound intensity at the predetermined frequency component of the BGM is high.

8. The storage medium according to claim 1, wherein
   the sound effect signal and the BGM signal are stereo signals, and
   a monophonic component obtained as a sum signal of a right channel signal and a left channel signal of the sound effect signal is calculated, and, when a sound intensity at the predetermined frequency component of the monophonic component is low, adjustment is performed such that a sound intensity at the predetermined frequency component of a monophonic component of the BGM is decreased.

9. The storage medium according to claim 1, wherein
   the sound processing program, when executed, further causes the computer to perform game processing based on an operation input to an operation device, and
   the sound effect signal is a sound effect that is outputted when a predetermined event occurs in a virtual game space while the game processing is performed.

10. A sound processing system comprising at least one processor, the at least one processor being configured to execute:
    outputting a BGM signal of sound of BGM, over time;
    outputting a sound effect signal of sound of a sound effect, at a timing determined based on information processing;
    if it is determined that a sound intensity at a predetermined frequency component of the sound effect to be outputted is low or a sound intensity at the predetermined frequency component of the BGM is high, performing adjustment such that the sound intensity at the predetermined frequency component of the BGM to be outputted, at the same timing as the sound effect, is decreased; and
    generating a final sound signal including the sound of the sound effect and the sound of the BGM on which the adjustment has been performed, by synthesis, and outputting the final sound signal to the outside.

11. The sound processing system according to claim 10, wherein the at least one processor is further configured to execute:
    calculating a sound intensity at each of a plurality of predetermined frequency components for each of the sound effect signal and the BGM signal; and for a frequency component for which it is determined that the sound intensity of the sound effect is low among the plurality of predetermined frequency components, performing adjustment such that the sound intensity at said frequency component of the BGM to be outputted, at the same timing as the sound effect, is decreased.

12. The sound processing system according to claim 11, wherein the at least one processor is configured to calculate the sound intensity at each of the plurality of predetermined frequency components based on a discrete Fourier transform.

13. The sound processing system according to claim 10, wherein, when the sound intensity at the predetermined frequency component of the sound effect is lower than the sound intensity at the predetermined frequency component of the BGM by a predetermined amount or greater, the at least one processor is configured to determine that the sound intensity at the predetermined frequency component of the sound effect is low or the sound intensity at the predetermined frequency component of the BGM is high.

14. The sound processing system according to claim 10, wherein, when the sound intensity at the predetermined frequency component of the sound effect is lower than a predetermined threshold, the at least one processor is configured to determine that the sound intensity at the predetermined frequency component of the sound effect is low.

15. The sound processing system according to claim 10, wherein, when the sound intensity at the predetermined frequency component of the BGM is higher than a predetermined threshold, the at least one processor is configured to determine that the sound intensity at the predetermined frequency component of the BGM is high.

16. The sound processing system according to claim 10, wherein
the sound intensity of the BGM is set based on an intensity of the sound effect, and
when the sound intensity at the predetermined frequency component of the sound effect is higher than a predetermined threshold, the at least one processor is configured to determine that the sound intensity at the predetermined frequency component of the BGM is high.

17. The sound processing system according to claim 10, wherein
the sound effect signal and the BGM signal are stereo signals, and
the at least one processor is configured to calculate a monophonic component obtained as a sum signal of a right channel signal and a left channel signal of the sound effect signal, and, when a sound intensity at the predetermined frequency component of the monophonic component is low, the at least one processor is configured to perform adjustment such that a sound intensity at the predetermined frequency component of a monophonic component of the BGM is decreased.

18. The sound processing system according to claim 10, wherein
the at least one processor is further configured to perform game processing based on an operation input to an operation device, and
the sound effect signal is a sound effect that is outputted when a predetermined event occurs in a virtual game space while the game processing is performed.

19. A sound processing apparatus comprising at least one processor, the at least one processor configured to execute:
outputting a BGM signal of sound of BGM, over time;
outputting a sound effect signal of sound of a sound effect, at a timing determined based on information processing;
if it is determined that a sound intensity at a predetermined frequency component of the sound effect to be outputted is low or a sound intensity at the predetermined frequency component of the BGM is high, performing adjustment such that the sound intensity at the predetermined frequency component of the BGM to be outputted, at the same timing as the sound effect, is decreased; and
generating a final sound signal including the sound of the sound effect and the sound of the BGM on which the adjustment has been performed, by synthesis, and outputting the final sound signal to the outside.

20. The sound processing apparatus according to claim 19, wherein the at least one processor is further configured to execute:
calculating a sound intensity at each of a plurality of predetermined frequency components for each of the sound effect signal and the BGM signal; and
for a frequency component for which it is determined that the sound intensity of the sound effect is low among the plurality of predetermined frequency components, performing adjustment such that the sound intensity at said frequency component of the BGM to be outputted, at the same timing as the sound effect, is decreased.

21. A sound processing method executed by a computer that controls an information processing apparatus, the sound processing method causing the computer to:
output a BGM signal of sound of BGM, over time;
output a sound effect signal of sound of a sound effect, at a timing determined based on information processing;
if it is determined that a sound intensity at a predetermined frequency component of the sound effect to be outputted is low or a sound intensity at the predetermined frequency component of the BGM is high, perform adjustment such that the sound intensity at the predetermined frequency component of the BGM to be outputted, at the same timing as the sound effect, is decreased; and
generate a final sound signal including the sound of the sound effect and the sound of the BGM on which the adjustment has been performed, by synthesis, and output the final sound signal to the outside.

22. The sound processing method according to claim 21, further causing the computer to:
calculate a sound intensity at each of a plurality of predetermined frequency components for each of the sound effect signal and the BGM signal; and
for a frequency component for which it is determined that the sound intensity of the sound effect is low among the plurality of predetermined frequency components, perform adjustment such that the sound intensity at said frequency component of the BGM to be outputted, at the same timing as the sound effect, is decreased.

* * * * *